United States Patent
Zargar et al.

(10) Patent No.: US 10,659,484 B2
(45) Date of Patent: May 19, 2020

(54) HIERARCHICAL ACTIVATION OF BEHAVIORAL MODULES ON A DATA PLANE FOR BEHAVIORAL ANALYTICS

(71) Applicant: Cisco Technology, Inc., San Jose, CA (US)

(72) Inventors: Saman Taghavi Zargar, Milpitas, CA (US); Subharthi Paul, San Jose, CA (US); Prashanth Patil, San Jose, CA (US); Jayaraman Iyer, Sunnyvale, CA (US); Hari Shankar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 272 days.

(21) Appl. No.: 15/898,915

(22) Filed: Feb. 19, 2018

(65) Prior Publication Data
US 2019/0260776 A1 Aug. 22, 2019

(51) Int. Cl.
*H04L 29/06* (2006.01)
*H04L 12/24* (2006.01)
*G06N 20/00* (2019.01)

(52) U.S. Cl.
CPC ......... *H04L 63/1425* (2013.01); *G06N 20/00* (2019.01); *H04L 41/145* (2013.01);
(Continued)

(58) Field of Classification Search
CPC ... H04L 63/1425; H04L 63/145; H04L 63/20; H04L 63/1458; H04L 2463/142; H04L 41/145
(Continued)

(56) References Cited

U.S. PATENT DOCUMENTS 8,515,160 B1 * 8/2013 Khosla ................ G06K 9/4623
382/156
9,306,965 B1 4/2016 Grossman et al.
(Continued)

FOREIGN PATENT DOCUMENTS

CN 104539595 A 4/2015

OTHER PUBLICATIONS

Ye, Yanfang, et al. "Hierarchical associative classifier (HAC) for malware detection from the large and imbalanced gray list." Journal of Intelligent Information Systems 35.1 (2010): 1-20. (Year: 2010).*
(Continued)

*Primary Examiner* — Syed A Zaidi
(74) *Attorney, Agent, or Firm* — Behmke Innovation Group LLC; James M. Behmke; Jonathon P. Western

(57) ABSTRACT

In one embodiment, a centralized controller maintains a plurality of hierarchical behavioral modules of a behavioral model, and distributes initial behavioral modules to data plane entities to cause them to apply the initial behavioral modules to data plane traffic. The centralized controller may then receive data from a particular data plane entity based on its having applied the initial behavioral modules to its data plane traffic. The centralized controller then distributes subsequent behavioral modules to the particular data plane entity to cause it to apply the subsequent behavioral modules to the data plane traffic, the subsequent behavioral modules selected based on the previously received data from the particular data plane entity. The centralized controller may then iteratively receive data from the particular data plane entity and distribute subsequently selected behavioral modules until an attack determination is made on the data plane traffic of the particular data plane entity.

20 Claims, 9 Drawing Sheets

(52) U.S. Cl.
CPC ........ *H04L 63/145* (2013.01); *H04L 63/1458* (2013.01); *H04L 63/20* (2013.01); *H04L 2463/142* (2013.01)

(58) Field of Classification Search
USPC .......................................................... 726/23
See application file for complete search history.

(56) References Cited

U.S. PATENT DOCUMENTS

| | | | |
|---|---|---|---|
| 9,386,034 B2 | 7/2016 | Cochenour | |
| 9,641,544 B1 | 5/2017 | Treat et al. | |
| 10,027,689 B1* | 7/2018 | Rathor ................ | G06F 11/3006 |
| 2005/0188376 A1* | 8/2005 | Matsumoto ........ | G05B 23/0272 |
| | | | 718/104 |
| 2007/0136455 A1* | 6/2007 | Lee ...................... | G06F 21/564 |
| | | | 709/223 |
| 2007/0192863 A1* | 8/2007 | Kapoor .................. | G06F 9/505 |
| | | | 726/23 |
| 2009/0265778 A1* | 10/2009 | Wahl ................... | H04L 63/1416 |
| | | | 726/13 |
| 2010/0192222 A1* | 7/2010 | Stokes ................. | G06F 21/563 |
| | | | 726/22 |
| 2012/0317644 A1* | 12/2012 | Kumar ................. | G06F 21/552 |
| | | | 726/24 |
| 2015/0188935 A1* | 7/2015 | Vasseur .............. | H04L 63/1416 |
| | | | 726/23 |
| 2016/0359872 A1 | 12/2016 | Yadav et al. | |

OTHER PUBLICATIONS

NPL Search Results (Year: 2020).*

* cited by examiner

HIERARCHICAL ACTIVATION OF BEHAVIORAL MODULES ON A DATA PLANE FOR BEHAVIORAL ANALYTICS

TECHNICAL FIELD

The present disclosure relates generally to computer networks, and, more particularly, to hierarchical activation of behavioral modules on a data plane for behavioral analytics.

BACKGROUND

Modern computer networking threats are very sophisticated as their behaviors are becoming more dynamic and stealthy in nature. It is fair to say that each threat is a macro behavior which comprises of a chain of micro behaviors. For instance, data exfiltration is a macro behavior which could comprise various stages (micro behaviors) (e.g., secure shell ("ssh") brute force, and secure copy ("scp") data exfiltration, etc.). Such threats, if successful, are very hard to detect as various stages (behaviors) of their attack kill chain typically occur very slowly and in low volume. Moreover, defense mechanisms are not comprehensively unified to deconstruct various stages of the attack kill chain. With the fast-growing variations of these threats (e.g., advanced persistent threats), the complexity of the problem of deconstructing their kill chain very quickly becomes an ever-increasing challenge. Hence, the next generation of network security solutions needs to analyze enormous numbers of events over extended periods of time to better learn the attack behaviors. Additionally, defenders should be able to mimic various stages of attacks' kill chain, where these stages could be represented by newly defined behavioral models (e.g., behavioral analytics). Such behavioral models need to be very rich and easy to express.

Continuously and blindly capturing huge volumes of raw data over very long periods of time to learn attackers' behaviors is very expensive in terms of CPU cycles, memory, and power consumption. Moreover, current data planes are still mostly verbalized by static-function packet processing hardware.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
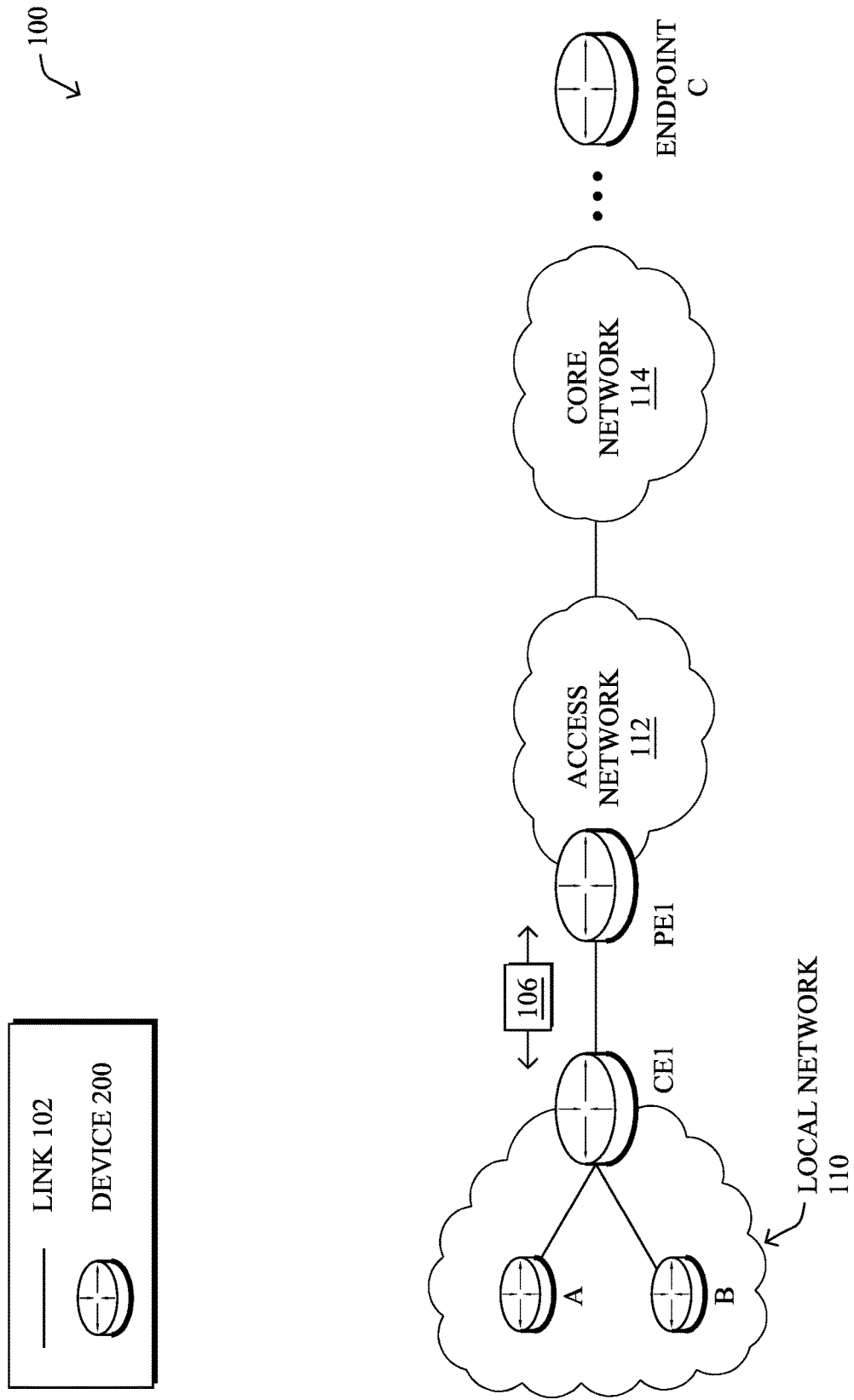
FIG. 1 illustrates an example communication network.

According to one or more embodiments of the disclosure, a centralized controller in a computer network maintains a plurality of hierarchical behavioral modules of a behavioral model, and distributes one or more initial behavioral modules of the plurality of hierarchical behavioral modules to one or more data plane entities to cause the one or more data plane entities to apply the one or more initial behavioral modules to data plane traffic at the respective data plane entities. Accordingly, the centralized controller may then receive data from a particular data plane entity of the one or more data plane entities based on the particular data plane entity applying the initial behavioral modules to data plane traffic at the particular data plane entity. The centralized controller may then distribute one or more subsequent behavioral modules of the plurality of hierarchical behavioral modules to the particular data plane entity to cause the particular data plane entity to apply the one or more subsequent behavioral modules to the data plane traffic, the one or more subsequent behavioral modules selected based on the previously received data from the particular data plane entity. The centralized controller may then iteratively receive data from the particular data plane entity based on the particular data plane entity applying the subsequent behavioral modules to the data plane traffic and distribute subsequently selected behavioral modules of the plurality of hierarchical behavioral modules to the particular data plane entity until an attack determination is made on the data plane traffic of the particular data plane entity.

According to one or more additional embodiments of the disclosure, a data plane entity in a computer network receives one or more initial behavioral modules of a plurality of hierarchical behavioral modules of a behavioral model from a centralized controller, and applies the one or more initial behavioral modules to data plane traffic at the data plane entity. In response, the data plane entity may send data to the centralized controller based on applying the one or more initial behavioral modules to the data plane traffic at the data plane entity to cause the centralized controller to distribute one or more subsequent behavioral modules of the plurality of hierarchical behavioral modules to the data plane entity, the one or more subsequent behavioral modules selected based on received data from the data plane entity. The data plane entity may then iteratively receive the one or more subsequent behavioral modules, apply the one or more subsequent behavioral modules to the data plane traffic, and send data to the centralized controller based on applying the one or more subsequent behavioral modules to the data plane traffic until an attack determination is made on the data plane traffic of the particular data plane entity.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

FIG. 1 is a schematic block diagram of an example communication network 100 illustratively comprising nodes/devices 200, such as a plurality of routers/devices interconnected by links and/or networks, as shown. For example, a customer edge (CE) router CE1 may interconnect nodes A and B on a local network 110 with a provider edge (PE) router PE1 of an access network 112. In turn, access network 112 may provide local network 110 with connectivity to a core network 114, such as the Internet.

The various nodes/devices 200 may exchange data packets 106 (e.g., traffic/messages) via communication network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. For example, node A in local network 110 may communicate with an endpoint node/device C (e.g., a remote server, etc.) via communication network 100.

As would be appreciated, links 102 may include any number of wired and/or wireless connections between devices. For example, node A may communicate wirelessly using a WiFi™ connection, CE1 and PE1 may communicate wirelessly using a cellular connection or via a hardwired connection (e.g., DSL, etc.), etc. In addition, while certain devices are depicted in FIG. 1, the view shown is a simplified view of communication network 100. In other words, communication network 100 may also include any number of intermediary networking devices such as, but not limited to, routers, switches, firewalls, etc., that are not shown.

In various embodiments, nodes/devices 200 may employ a secure communication mechanism, to encrypt and decrypt data packets 106. For example, nodes/devices 200 shown may use a Transport Layer Security (TLS) mechanism, such as the hypertext transfer protocol (HTTP) secure (HTTPS) protocol, to encrypt and decrypt data packets 106.

Figure 2:
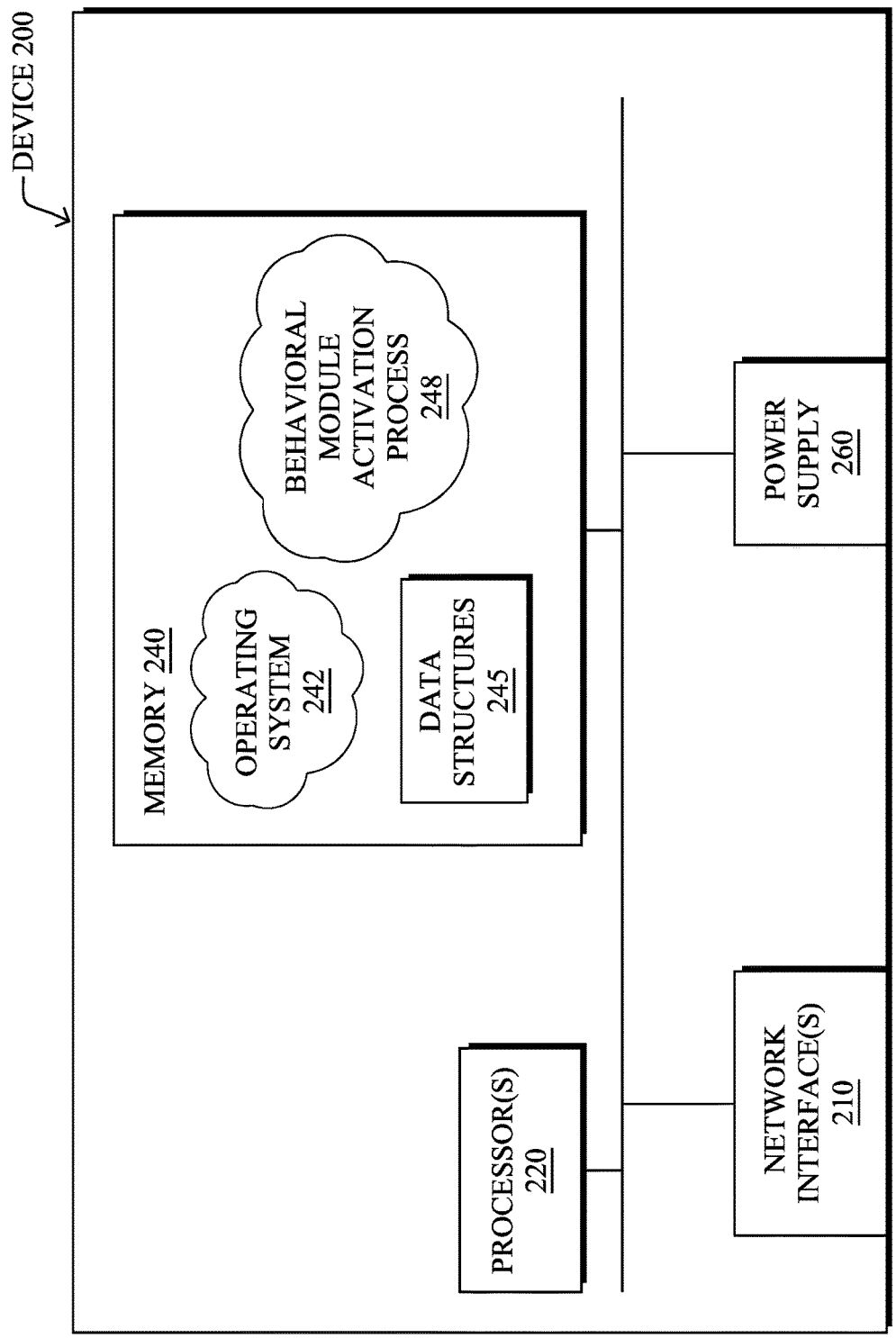
FIG. 2 illustrates an example network device/node.

FIG. 2 is a schematic block diagram of an example node/device 200 that may be used with one or more embodiments described herein, e.g., as any of the computing devices shown in FIG. 1, any other computing device that supports the operations of network 100 (e.g., switches, etc.), or any of the other devices referenced below. The device 200 may also be any other suitable type of device depending upon the type of network architecture in place. As shown, device 200 comprises one or more network interface(s) 210, one or more processor(s) 220, and a memory 240 interconnected by a system bus 250 and powered by a power supply 260.

The network interface(s) 210 include the mechanical, electrical, and signaling circuitry for communicating data over physical and/or wireless links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, among other things, invoking network operations in support of software processors and/or services executing on the device. These software processors and/or services may comprise a behavioral module activation process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

The device 200 may be part of a self-learning network (SLN), configured to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1) a lack of a ground truth (e.g., examples of normal vs. abnormal network behavior), 2) being able to define a "normal" region in a highly dimensional space can be challenging, 3) the dynamic nature of the problem due to changing network behaviors/anomalies, 4) malicious behaviors such as malware, viruses, rootkits, etc. may adapt in order to appear "normal," and 5) differentiating between noise and relevant anomalies is not necessarily possible from a statistical standpoint, but typically also requires domain knowledge.

Anomalies may also take a number of forms in a computer network: 1) point anomalies (e.g., a specific data point is abnormal compared to other data points), 2) contextual anomalies (e.g., a data point is abnormal in a specific context but not when taken individually), or 3) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

Malware may be detected based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1) a user using a discovery tool that performs (massive) undesirable scanning in the network (in contrast with a lawful scanning by a network management tool performing device discovery), 2) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. Identify these forms of misconfigurations allow them to be detected and fixed.

In various embodiments, machine learning techniques may be utilized to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, graph-based models may be used for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

Assume, for purposes of illustration, that a security device (e.g., a customer edge router, firewall, etc.) monitors traffic flows associated with the devices of a local network (e.g., by comparing the monitored conditions to one or more machine-learning models). For example, assume that device/node (e.g., node A) sends a particular traffic flow to a server (e.g., an application server, etc.). In such a case, the security device may monitor the packets of the traffic flow and, based on its local anomaly detection mechanism, determine that the traffic flow is anomalous. Anomalous traffic flows may be incoming, outgoing, or internal to a local network, in various cases.

In some cases, the traffic may be associated with a particular application supported by network 100. Such applications may include, but are not limited to, automation applications, control applications, voice applications, video applications, alert/notification applications (e.g., monitoring applications), communication applications, and the like. For example, traffic may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. The ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

—Hierarchical Activation of Behavioral Modules on a Data Plane—

Figure 3:
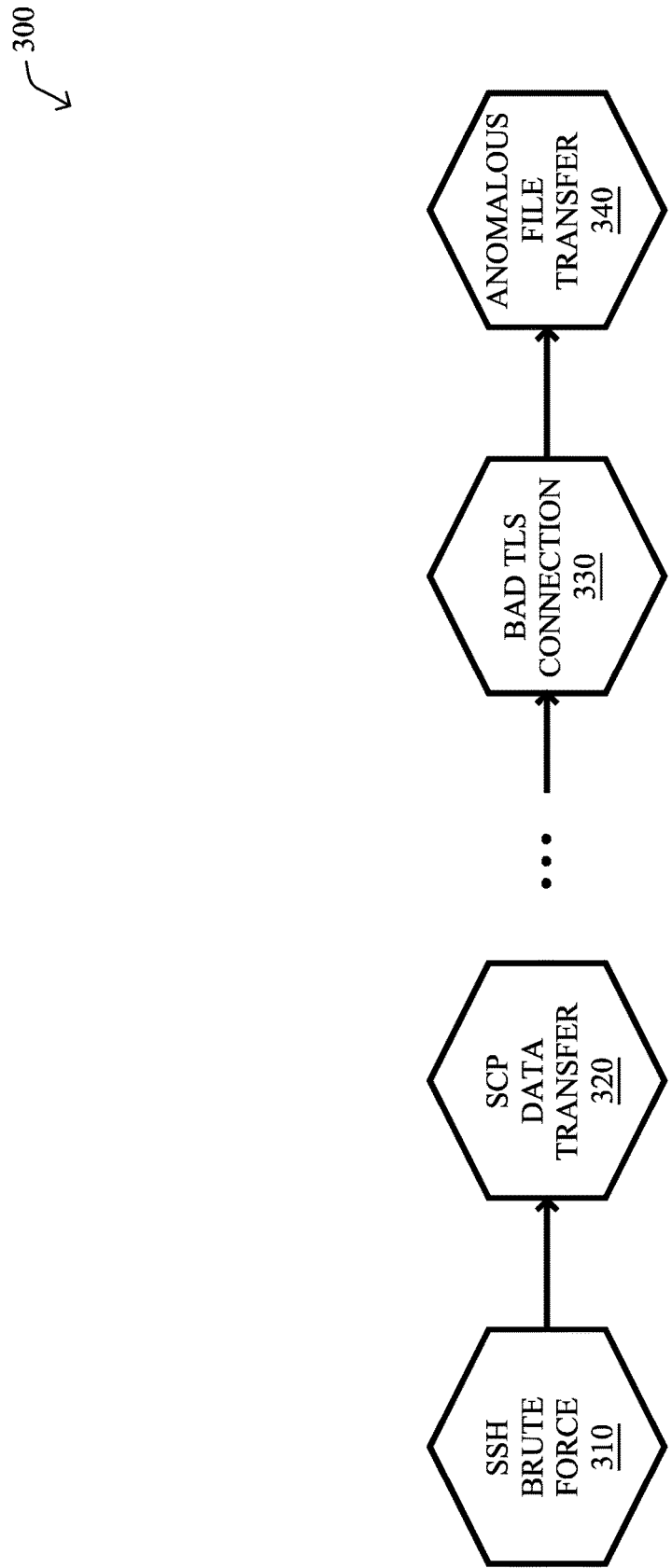
FIG. 3 illustrates an example "kill chain" macro behavior.

As noted above, computer networking threats are very sophisticated, being both dynamic and stealthy in nature. Generally, each threat is a macro behavior which comprises of a chain of micro behaviors. For instance, data exfiltration is a macro behavior which could comprise various stages (micro behaviors) (e.g., secure shell ("ssh") brute force, and secure copy ("scp") data exfiltration, etc.). FIG. 3, for example, illustrates one example macro behavior 300 comprising various micro behaviors, such as ssh brute force 310, scp data transfer 320, a bad TLS connection 330, and an anomalous file transfer 340. (Other examples will be understood by those skilled in the art, and this particular example is not meant to limit the present disclosure.)

As also noted above, threats such as this, if successful, are very hard to detect as various stages (behaviors) of their attack kill chain typically occur very slowly and in low volume. Moreover, defense mechanisms are not comprehensively unified to deconstruct various stages of the attack kill chain. With the fast-growing variations of these threats (e.g., advanced persistent threats), the complexity of the problem of deconstructing their kill chain very quickly becomes an ever-increasing challenge. Hence, the next generation of network security solutions needs to analyze enormous numbers of events over extended periods of time to better learn the attack behaviors. Additionally, defenders should be able to mimic various stages of attacks' kill chain, where these stages could be represented by newly defined behavioral models (e.g., behavioral analytics). Such behavioral models need to be very rich and easy to express. Also as mentioned, continuously and blindly capturing huge volumes of raw data over very long periods of time to learn attackers' behaviors is very expensive in terms of CPU cycles, memory, and power consumption. Moreover, current data planes are still mostly verbalized by static-function packet processing hardware.

In order to express rich behavioral models for various stages of the attack (targeted for various sophisticated threats), behavioral models for behavioral analytics should be programmable modules over data plane (i.e., behavioral module). Most of the current efforts towards implementing flexible network data plane thus far were dealing with performance penalties as a trade-off for flexibility. However, with the recent advances in high-performance programmable forwarding chips, programmable data plane with no performance, power, or cost penalty is very promising.

Therefore, an enterprise could enormously benefit from the capability of deploying such programmable behavioral modules to collect states for long period of time over the data plane. Moreover, such a setting benefits greatly from intelligent and optimal collection of only meaningful raw data or semi-processed/filtered data from the data plane (i.e., data that is required for targeted behavioral analytics) which would tremendously reduce the data collection costs. The techniques herein, therefore, propose an efficient deployment approach for targeted programmable behavioral modules for behavioral analytics (e.g., detection, hunting, and learning) over the data plane.

Said differently, the techniques herein provide a programmable data plane with a hybrid configuration and programmability approach. The data plane allows a rich configuration language for effectively extracting, filtering, and applying fixed pre-processors on the traffic and allowing programmability only within a physically constrained (and isolated) sandbox-like environment. The initial filtering and preprocessing is supposed to minimize the amount of traffic that needs to be processed by the programmable module. Also, the sandboxing approach helps constrain the resource and access of the code.

Specifically, according to one or more embodiments of the disclosure as described in detail below, a centralized controller maintains a plurality of hierarchical behavioral modules of a behavioral model, and distributes initial behavioral modules to data plane entities to cause them to apply the initial behavioral modules to data plane traffic. The centralized controller may then receive data from a particular data plane entity based on its having applied the initial behavioral modules to its data plane traffic. The centralized controller then distributes subsequent behavioral modules to the particular data plane entity to cause it to apply the subsequent behavioral modules to the data plane traffic, the subsequent behavioral modules selected based on the previously received data from the particular data plane entity. The centralized controller may then iteratively receive data from the particular data plane entity and distribute subsequently selected behavioral modules until an attack determination is made on the data plane traffic of the particular data plane entity.

Illustratively, the techniques described herein may be performed by hardware, software, and/or firmware, such as in accordance with the behavioral module activation process 248, which may include computer executable instructions executed by the processor 220 to perform functions relating to the techniques described herein, e.g., on a controller and/or data plane entity (as described below), in conjunction with one or more other processes and/or other devices, accordingly.

Operationally, the techniques herein assume that the data plane allows a rich configuration language for effectively extracting, filtering, and applying fixed pre-processors on the traffic, and that the initial filtering and preprocessing minimizes the amount of traffic that needs to be processed by the programmable module. (Also, certain embodiments herein may further assume that programmability is allowed only within a physically constrained (and isolated) sandbox-like environment, which helps constrain the resource and access of the code.)

According to one or more embodiments of the present disclosure, the techniques herein provide for conditional activation/deactivation of behavioral programming modules (e.g., based on other behavioral programming modules), thus allowing the programmability to be defined as a hierarchically complex function where only a very small fraction of the traffic needs to be processed by the most complex function. That is, the techniques herein allow threat detection behaviors to be expressed as a hierarchical set of indicators (e.g., a chain of micro behaviors). As detailed herein, the conditions on which subsequent behavioral modules may be activated may be based on thresholds on a set of computed parameters such as, e.g., events, time, location, role-based thresholds, and so on.

Behavioral analytics according to the techniques herein are evidence driven, where further data collection and processing is only necessary when initially processed data indicates the potential for suspicious behavior (e.g., volumetric DoS), which requires further investigation of the packets for confirmation. Operating in this manner greatly reduces the cost of continuous and blind capturing of large volumes of raw data for long periods of time. In doing so, one should be able to express rich behavioral models for various stages of the attack. Hence, behavioral models for behavioral analytics can be configured as programmable modules over the data plane (i.e., behavioral modules).

For instance, if the volume of traffic is all of a sudden triple a baseline volume, it may thus require further investigation for possible DoS flooding attacks, or else may be deemed simply as the result of an unexpected flash crowd. Hence, the first behavioral module's matching condition (e.g., high volume of traffic) enables the next behavioral module(s) (e.g., HTTP flooding, UDP flooding, TCP flooding, etc.) for further data collection and processing and so on. The behavioral modules may then be continuously activated (e.g., hierarchy is expanded) as necessary, that is, until the investigation leads to a conclusion. Then, the behavioral modules that are no longer necessary may be deactivated (hierarchically is reduced) as necessary up to an initial behavioral module in the hierarchy.

As detailed in FIGS. 4A-4D below, the techniques herein provide for conditional activation of the behavioral programming modules by other behavioral programming modules, thus allowing the programmability to be defined as a hierarchically complex function where only a very small fraction of the traffic needs to be processed by the most complex function. This is an effective design for a data plane designed for threat detection use cases because most of the threat detection behaviors can be expressed as a hierarchical set of indicators (chain of micro behaviors).

For instance, with reference generally to FIGS. 4A-4D, environment 400 comprises a centralized controller 410 for orchestration, management, correlation, and learning, specifically maintaining various targeted behavioral modules 420 written with the language supported by the data plane. Notably, behavioral modules 420 should be available to be pushed to data plane entities 430 (e.g., router, switch, access point, firewall, server, host computer, etc.), and activated/deactivated as needed over the data plane 435. In particular, such threat targeted behavioral modules are activated and/or deactivated for data collection in a hierarchical manner. That is, activation/deactivation of the modules could be dependent on certain conditions resulted from analyzing previously activated behavioral module's collected data by the central controller. Additionally, the centralized controller 410 may be configured to communicate with a behavioral learning backend 415, such as cloud services or other processes/servers, accordingly.

Figure 4A:
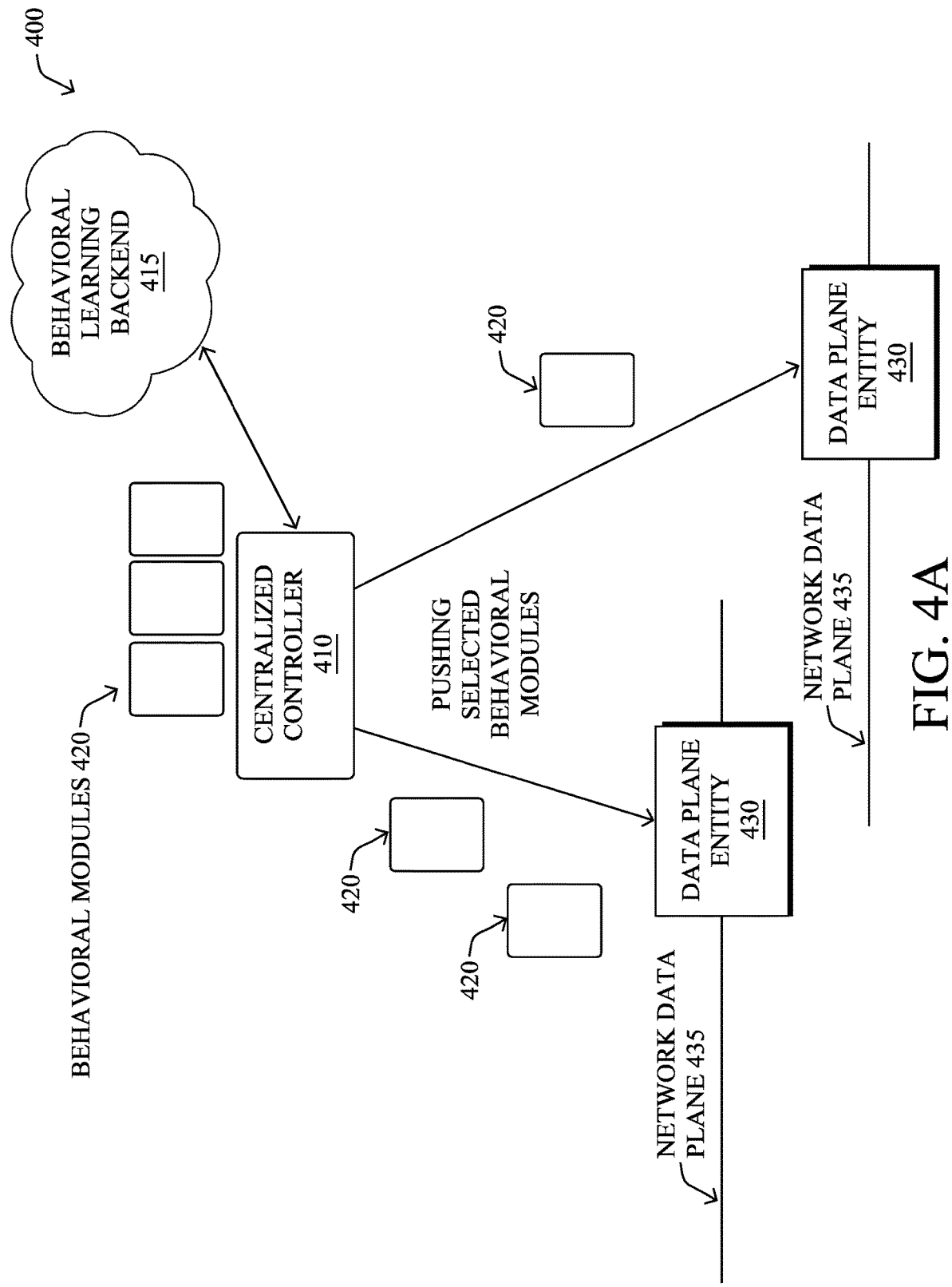
FIGS. 4A-4D illustrate an example of hierarchical activation of behavioral modules on a data plane for behavioral analytics.

As shown specifically in FIG. 4A, the centralized controller 410 initially pushes a set of basic behavioral modules 420 to the data plane entities (sensors) 430 to activate those modules and start collecting and exporting data required for behavioral analytics. The initial set of behavioral modules attempt to mimic the first stages of various kill chains (e.g., reconnaissance). Activated behavioral modules, in particular, are configured to collect raw/pre-processed/filtered data targeted for that module.

Figure 4B:
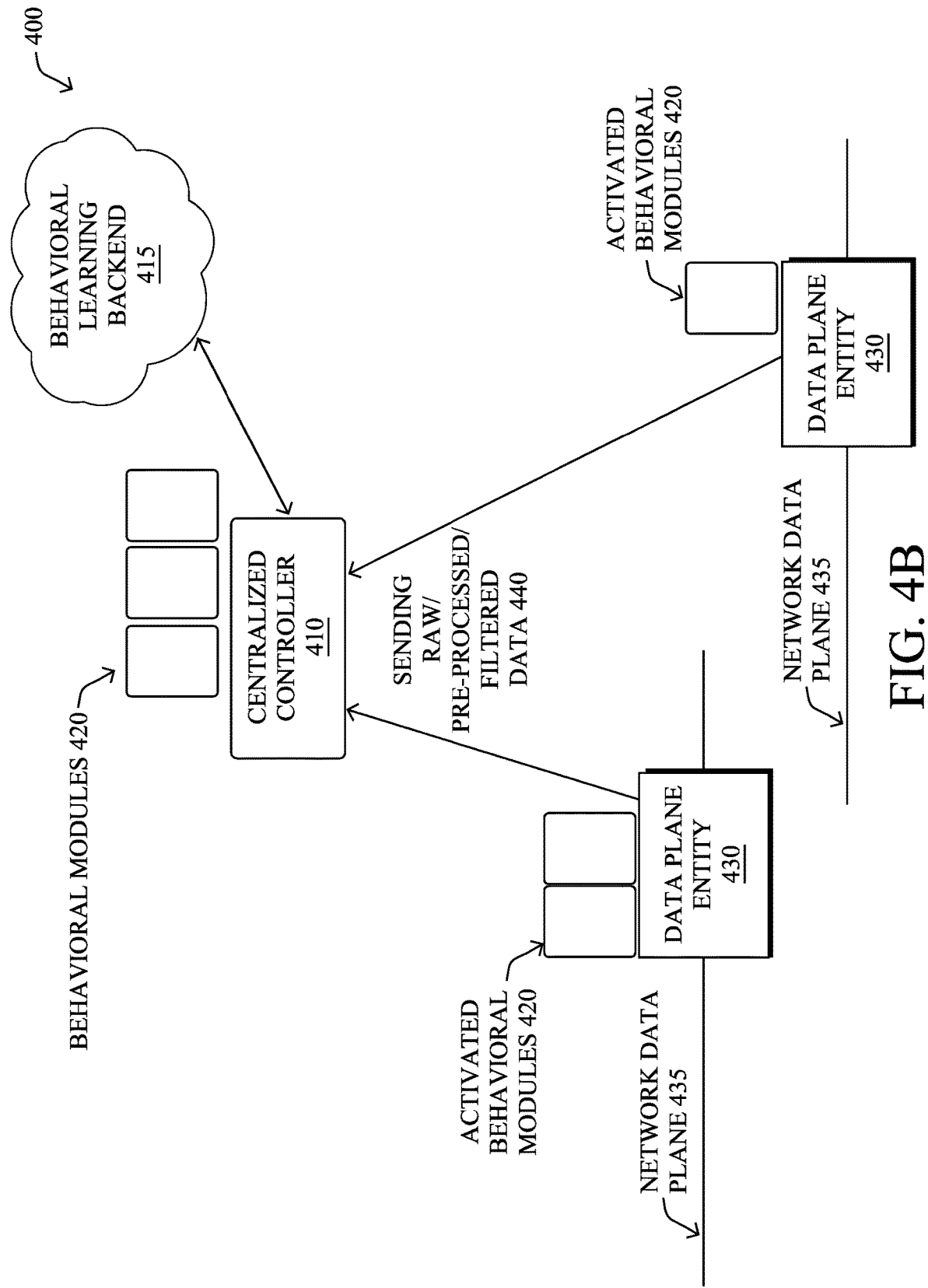
Figure 4C:
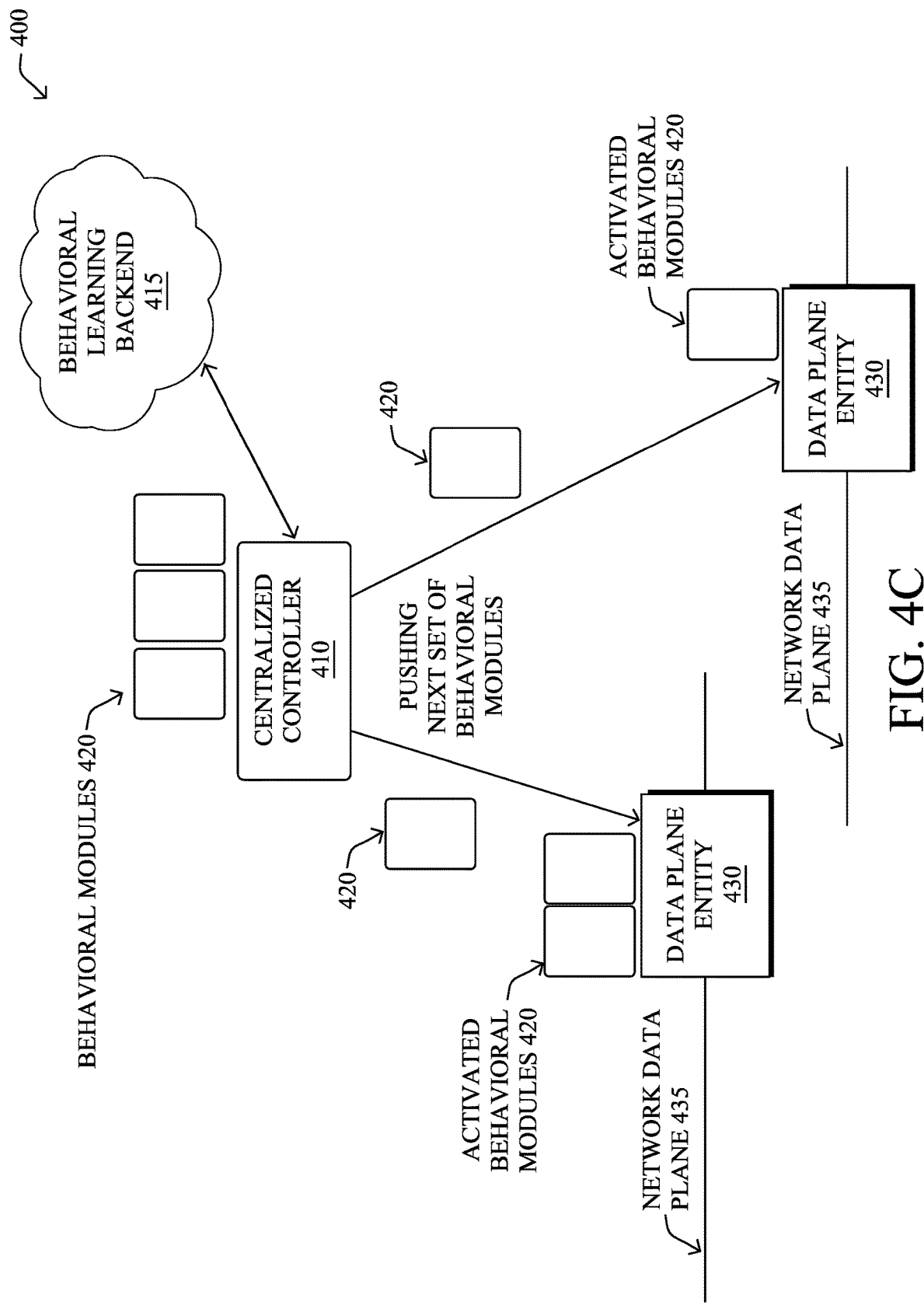
Figure 4D:
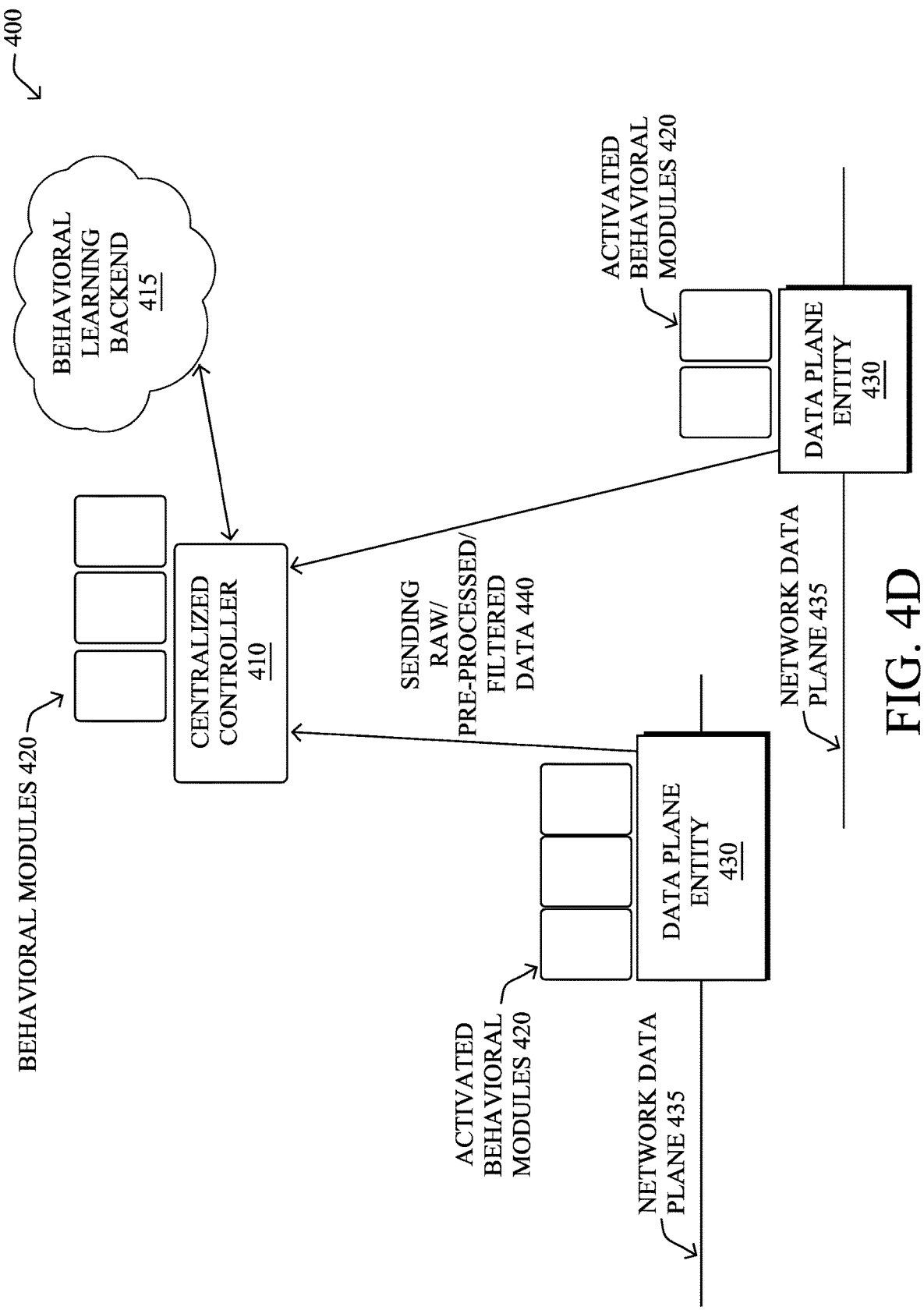

As shown in FIG. 4B, the data plane entities may push their data 440 back to the centralized controller, which consumes and learns the data collected from the activated modules. That is, upon receiving data from the data plane for each of the modules, the behavioral analytics solution on the central controller analyzes the data and feeds its learning algorithms with that data. Once any of the behavioral models detects suspicious activity or successful execution of any micro behavioral modules of any chain of behaviors (e.g., attack kill chain), the next set of behavioral modules relevant to those macro behaviors may then be pushed to the data plane entities to be activated, as shown in FIG. 4C. In other words, the controller entity, based on training and learning, decides on pushing and enabling the next behavioral module or set of behavioral modules. The expansion of such a decision tree continues (e.g., receiving more data in FIG. 4D, coming up with further behavioral modules to send, etc.) until any macro behavior is detected, e.g., an attack is detected, or else a benign decision could be made. Once proper actions are taken for the detected attack and when there is no more need for some of the micro behavior modules, those modules may then be deactivated to reduce the overhead on data plane.

Note that while an example of a volumetric attack scenario is provided above, the techniques herein do not only pertain to high volumes only. For example, doing deep packet inspection (DPI) over patterns in the application-level payloads in flows entails lot of processing and so this processing may not be performed for all flows. Instead, the techniques herein allow a security researcher to define a less complex set of processing, such as looking for aggregate counts of flows from an internal host to an external (possible suspicious set of geo-locations) locations and if the number of flows (or count of bytes transferred) crosses a particular threshold, the techniques herein activate/instantiate appropriate modules to do more complex application-level DPI analysis for flows from that particular set of end-points (could be both for the internal hosts- to find ongoing data breaches or external hosts—to identify new data breaches). As described herein, this approach is meant to reduce the amount of complex processing that is required for identifying threats that require complex analysis. Also, the system should be able to support shutting off these complex analysis modules based on some conditions which can either be automatic such as a simple timer on how long ago data was seen for these flows, automatic remediation action taken by the system such as blacklisting the set of external/internal IP addresses or may be manual (needing some sort of administrator action).

Figure 5:
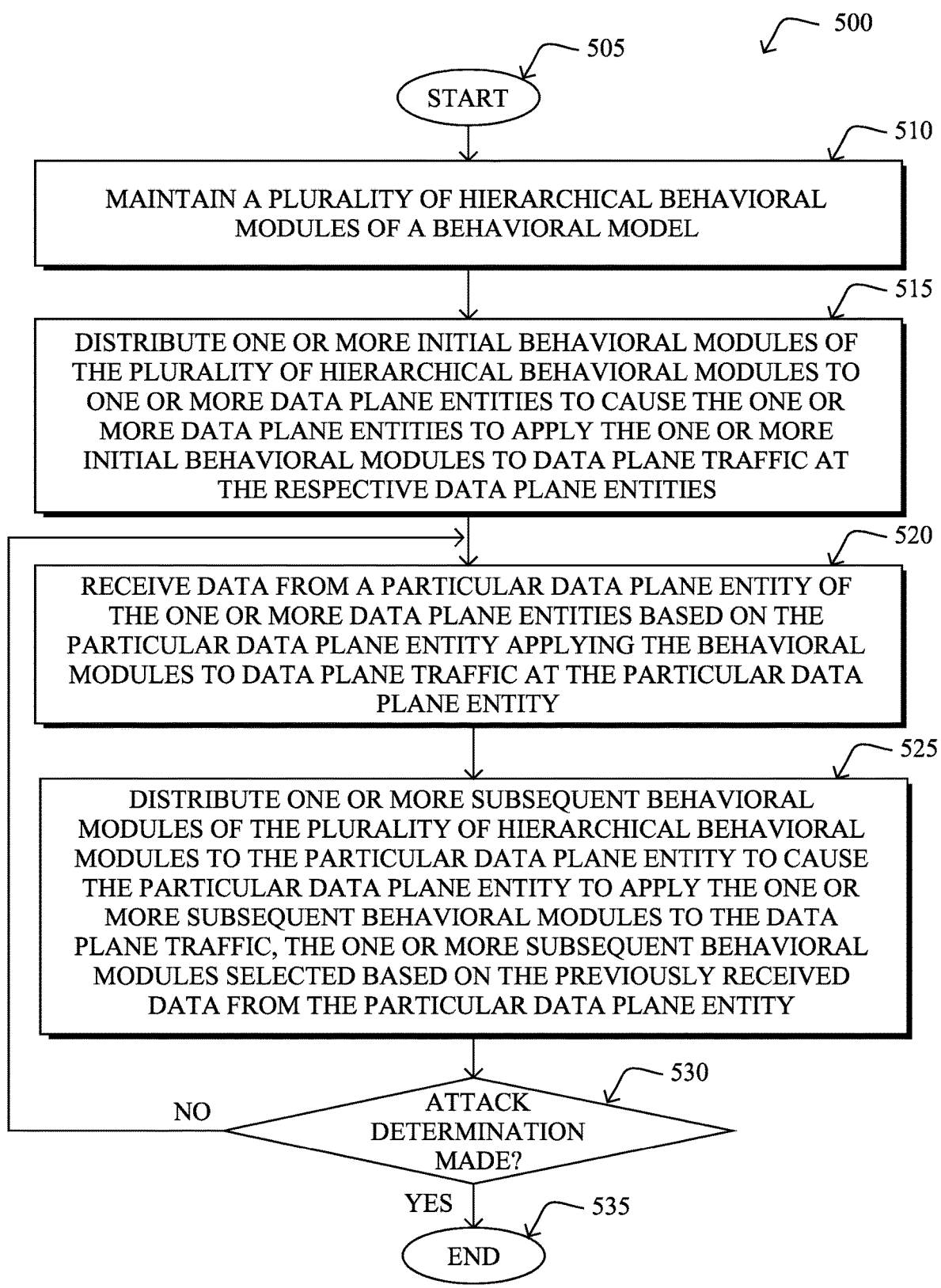
FIG. 5 illustrates an example simplified procedure for hierarchical activation of behavioral modules on a data plane for behavioral analytics, particularly from the perspective of a centralized controller.

FIG. 5 illustrates an example simplified procedure for hierarchical activation of behavioral modules on a data plane for behavioral analytics in accordance with one or more embodiments described herein, particularly from the perspective of the centralized controller. For example, a non-generic, specifically configured device (e.g., device 200) may perform procedure 500 by executing stored instructions (e.g., process 248). The procedure 500 may start at step 505, and continues to step 510, where, as described in greater detail above, the centralized controller maintains a plurality of hierarchical behavioral modules of a behavioral model. Notably, the behavioral model may be based on receiving input from a behavioral learning backend, which may also provide input into the modules used and determinations made herein.

In step 515, the centralized controller distributes one or more initial behavioral modules of the plurality of hierarchical behavioral modules 420 to one or more data plane entities 430 to cause the one or more data plane entities to apply the one or more initial behavioral modules to data plane traffic 435 at the respective data plane entities. For instance, in the example described above, the initial behavioral module may comprise a traffic volume module.

In step 520, the centralized controller may then receive data 440 (e.g., raw traffic data, filtered traffic data, and/or pre-processed data) from a particular data plane entity of the one or more data plane entities based on the particular data plane entity applying the initial behavioral modules to data plane traffic at the particular data plane entity. As such, the centralized controller may then distribute one or more subsequent behavioral modules of the plurality of hierarchical behavioral modules to the particular data plane entity in step 525 to cause the particular data plane entity to apply the one or more subsequent behavioral modules to the data plane traffic. As described in greater detail above, the one or more subsequent behavioral modules are selected based on the previously received data from the particular data plane entity, and may be increasingly more complex than previous behavioral modules.

From here, the centralized controller may iteratively receive data (step 520) from the particular data plane entity based on the particular data plane entity applying the subsequent behavioral modules to the data plane traffic and distribute (step 525) subsequently selected behavioral modules of the plurality of hierarchical behavioral modules to the particular data plane entity, until an attack determination is made on the data plane traffic of the particular data plane entity in step 530. (Note that the centralized controller may make the attack determination, or else the data plane entity, or even the behavioral learning backend, may make the determination.)

At this time, the particular data plane entity may deactivate all behavioral modules (e.g., except the initial behavioral modules in response to the attack determination being made), and the simplified procedure 500 may then end in step 535, notably with the option to continue receiving updated data from data plane entities, or else sending new initial modules, and so on.

Figure 6:
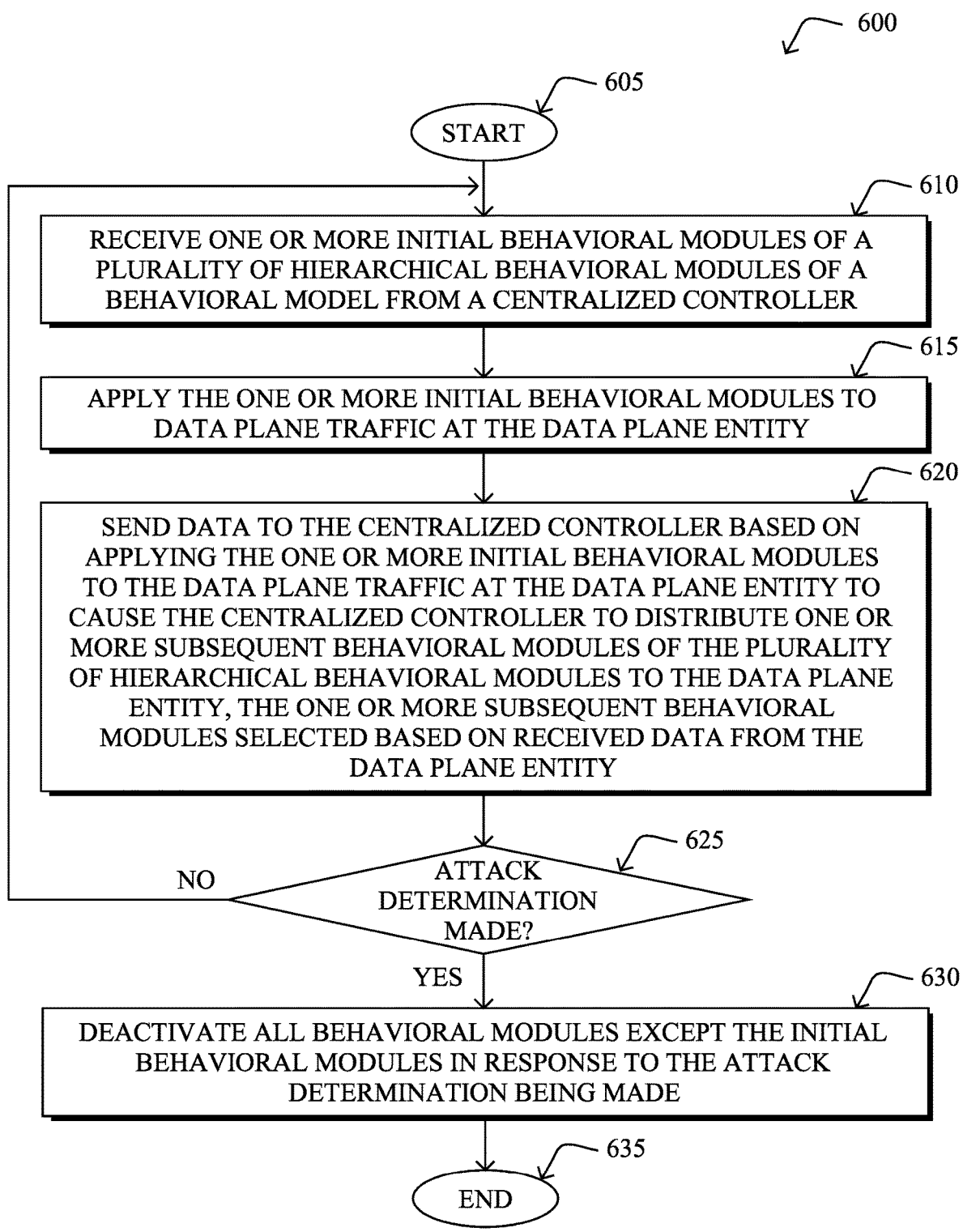
FIG. 6 illustrates another example simplified procedure for hierarchical activation of behavioral modules on a data plane for behavioral analytics, particularly from the perspective of a data plane entity.

Additionally, FIG. 6 illustrates another example simplified procedure for hierarchical activation of behavioral modules on a data plane for behavioral analytics in accordance with one or more embodiments described herein, particularly from the perspective of a data plane entity. For example, a non-generic, specifically configured device (e.g., device 200) may perform procedure 600 by executing stored instructions (e.g., process 248). The procedure 600 may start at step 605, and continues to step 610, where, as described in greater detail above, a data plane entity 430 receives one or more initial behavioral modules 420 of a plurality of hierarchical behavioral modules of a behavioral model from a centralized controller 410. Accordingly, in step 615, the data plane entity may then apply the one or more initial behavioral modules to data plane traffic 435 at the data plane entity, and may send data to the centralized controller in step 620 based on applying the one or more initial behavioral modules to the data plane traffic at the data plane entity. Notably, raw traffic data may be sent, or else some degree of filtering (filtered traffic data) or pre-processing (pre-processed data) may take place in this step. As described above, this data causes the centralized controller to distribute one or more subsequent behavioral modules of the plurality of hierarchical behavioral modules to the data plane entity, the one or more subsequent behavioral modules selected based on received data from the data plane entity.

The data plane entity may then iteratively receive (step 610) the one or more subsequent behavioral modules (e.g., increasingly more complex than previous behavioral modules), apply (step 615) the one or more subsequent behavioral modules to the data plane traffic, and send data (step 620) to the centralized controller based on applying the one or more subsequent behavioral modules to the data plane traffic, until an attack determination is made on the data plane traffic of the particular data plane entity in step 625

(e.g., by the data plane entity or otherwise). According to one embodiment, the data plane entity may then deactivate all behavioral modules in step 630 (e.g., except the initial behavioral modules) in response to the attack determination being made, or in certain embodiments, once attack mitigation is completed (or other trigger). The illustrative procedure 600 may then end in step 635, notably with the ability to receive further modules, and/or send further data based on applying the module(s), accordingly.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, provide for hierarchical activation of behavioral modules on a data plane for behavioral analytics. In particular, the techniques herein provide for cost-effective intelligent threat analytics, where the system proposed herein establishes targeted programmable behavioral modules for behavioral analytics (e.g., detection, hunting, and learning) over the data plane addressing one of the main challenges for behavioral analytics. Moreover, SLNs are not currently programmable on the data plane (i.e., they cannot be changed on the fly). The techniques herein, however, provide a dynamic platform for enhanced (and modular) behavioral analytics control, setting up a hierarchy for processing based on the complexity of each processing step. That is, the techniques herein provide for selective and conditional activation of analysis functions mapped over a hierarchy based on processing complexity by trying to naturally partition and map the end-to-end threat identification function across this hierarchy (e.g., a platform for partitioning the processing required to "evaluate" a complex model across a set of analysis functions that may be conditionally and selectively activated on demand, especially where the model can be expressed in terms of a sequence of hierarchical steps of increasing analysis complexity).

While there have been shown and described illustrative embodiments that provide for hierarchical activation of behavioral modules on a data plane for behavioral analytics, it is to be understood that various other adaptations and modifications may be made within the spirit and scope of the embodiments herein. For example, while certain embodiments are described herein with respect to using certain models, features, labels, data, etc., for purposes of malware detection, the techniques herein are not limited as such and may be used with other particulars, in other embodiments. In addition, while certain protocols are shown, such as IP, HTTP, TLS, etc., other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   maintaining, by a centralized controller in a computer network, a plurality of hierarchical behavioral modules of a behavioral model;
   distributing, by the centralized controller, one or more initial behavioral modules of the plurality of hierarchical behavioral modules to one or more data plane entities to cause the one or more data plane entities to apply the one or more initial behavioral modules to data plane traffic at the respective data plane entities;
   receiving, by the centralized controller, data from a particular data plane entity of the one or more data plane entities based on the particular data plane entity applying the initial behavioral modules to data plane traffic at the particular data plane entity;
   distributing, by the centralized controller, one or more subsequent behavioral modules of the plurality of hierarchical behavioral modules to the particular data plane entity to cause the particular data plane entity to apply the one or more subsequent behavioral modules to the data plane traffic, the one or more subsequent behavioral modules selected based on the previously received data from the particular data plane entity; and
   iteratively receiving data from the particular data plane entity based on the particular data plane entity applying the subsequent behavioral modules to the data plane traffic and distributing subsequently selected behavioral modules of the plurality of hierarchical behavioral modules to the particular data plane entity, by the centralized controller, until an attack determination is made on the data plane traffic of the particular data plane entity.

2. The method as in claim 1, wherein subsequent behavioral modules are increasingly more complex than previous behavioral modules.

3. The method as in claim 1, wherein the received data is selected from a group consisting of: raw traffic data; filtered traffic data; and pre-processed data.

4. The method as in claim 1, further comprising:
   making the attack determination by the centralized controller.

5. The method as in claim 1, wherein the particular data plane entity deactivates all behavioral modules except the initial behavioral modules in response to the attack determination being made.

6. The method as in claim 1, wherein the one or more initial behavioral modules comprise a traffic volume module.

7. The method as in claim 1, further comprising:
   receiving input from a behavioral learning backend.

8. A tangible, non-transitory, computer-readable medium storing program instructions that cause a computer to execute a process comprising:
   maintaining a plurality of hierarchical behavioral modules of a behavioral model;
   distributing one or more initial behavioral modules of the plurality of hierarchical behavioral modules to one or more data plane entities to cause the one or more data plane entities to apply the one or more initial behavioral modules to data plane traffic at the respective data plane entities;

receiving data from a particular data plane entity of the one or more data plane entities based on the particular data plane entity applying the initial behavioral modules to data plane traffic at the particular data plane entity;

distributing one or more subsequent behavioral modules of the plurality of hierarchical behavioral modules to the particular data plane entity to cause the particular data plane entity to apply the one or more subsequent behavioral modules to the data plane traffic, the one or more subsequent behavioral modules selected based on the previously received data from the particular data plane entity; and iteratively receiving data from the particular data plane entity based on the particular data plane entity applying the subsequent behavioral modules to the data plane traffic and distributing subsequently selected behavioral modules of the plurality of hierarchical behavioral modules to the particular data plane entity until an attack determination is made on the data plane traffic of the particular data plane entity.

9. The computer-readable medium as in claim 8, wherein subsequent behavioral modules are increasingly more complex than previous behavioral modules.

10. The computer-readable medium as in claim 8, wherein the received data is selected from a group consisting of: raw traffic data; filtered traffic data; and pre-processed data.

11. The computer-readable medium as in claim 8, wherein the process further comprises:
making the attack determination.

12. The computer-readable medium as in claim 8, wherein the particular data plane entity deactivates all behavioral modules except the initial behavioral modules in response to the attack determination being made.

13. The computer-readable medium as in claim 8, wherein the one or more initial behavioral modules comprise a traffic volume module.

14. The computer-readable medium as in claim 8, wherein the process further comprises:
receiving input from a behavioral learning backend.

15. A method, comprising:

receiving, by a data plane entity in a computer network, one or more initial behavioral modules of a plurality of hierarchical behavioral modules of a behavioral model from a centralized controller;

applying, by the data plane entity, the one or more initial behavioral modules to data plane traffic at the data plane entity;

sending, by the data plane entity, data to the centralized controller based on applying the one or more initial behavioral modules to the data plane traffic at the data plane entity to cause the centralized controller to distribute one or more subsequent behavioral modules of the plurality of hierarchical behavioral modules to the data plane entity, the one or more subsequent behavioral modules selected based on received data from the data plane entity; and iteratively receiving the one or more subsequent behavioral modules, applying the one or more subsequent behavioral modules to the data plane traffic, and sending data to the centralized controller based on applying the one or more subsequent behavioral modules to the data plane traffic, by the data plane entity, until an attack determination is made on the data plane traffic of the particular data plane entity.

16. The method as in claim 15, wherein subsequent behavioral modules are increasingly more complex than previous behavioral modules.

17. The method as in claim 15, wherein the sent data is selected from a group consisting of: raw traffic data; filtered traffic data; and pre-processed data.

18. The method as in claim 15, further comprising:
making the attack determination by the data plane entity.

19. The method as in claim 15, further comprising:
deactivating all behavioral modules except the initial behavioral modules in response to the attack determination being made.

20. The method as in claim 15, wherein the data plane entity is selected from a group consisting of: a router; a switch; an access point; a firewall; a server; and a host computer.

* * * * *